(12) United States Patent
Liao

(10) Patent No.: US 7,862,053 B2
(45) Date of Patent: Jan. 4, 2011

(54) GOLF BAG CART FOLDABLE DEVICE

(75) Inventor: Gordon Liao, Yung Kang (TW)

(73) Assignee: Unique Product & Design Co., Ltd., Tainan Hsien (TW)

( * ) Notice: Subject to any disclaimer, the term of this patent is extended or adjusted under 35 U.S.C. 154(b) by 294 days.

(21) Appl. No.: 12/208,385

(22) Filed: Sep. 11, 2008

(65) Prior Publication Data
US 2010/0059948 A1    Mar. 11, 2010

(51) Int. Cl.
*B62B 3/02* (2006.01)
*B62B 3/10* (2006.01)
*B62B 3/12* (2006.01)

(52) U.S. Cl. .................. 280/47.34; 280/38; 280/652; 280/47.2; 280/DIG. 6

(58) Field of Classification Search .................. 280/638, 280/35, 639, 38, 641, 642, 651, 652, 43.1, 280/47.131, 47.17, 47.2, 47.26, 47.34, 47.371, 280/79.11, 79.7, DIG. 6
See application file for complete search history.

(56) References Cited

U.S. PATENT DOCUMENTS 2,806,709 A * 9/1957 Watson ........................ 280/38
4,455,030 A * 6/1984 Rosen ...................... 280/47.19
5,180,184 A * 1/1993 Chiu .......................... 280/646

* cited by examiner

*Primary Examiner*—J. Allen Shriver, II
*Assistant Examiner*—Bryan A Evans
(74) *Attorney, Agent, or Firm*—Alan Kamrath; Kamrath & Associates PA

(57) ABSTRACT

A golf bag cart foldable device includes a bottom cart stand having a link segment at its top, where both sides of the link segment each is in pinned connection with a rear wheel frame, which has its bottom end join the rear wheel, and the bottom cart stand is provided with a slider at the bottom of the link segment. An upper cart stand is in pinned connection with the link segment at its bottom, and has a bracket at its top, where the bracket couples to a mount at its one end. A handle bar is joined the mount at its bottom at which an angle adjustable joint is located, and has a score board at its top. A linkage set comprises a first linkage being set up between the upper cart stand and the slider, a second linkage being set up between the slider and the rear wheel frame, and a third linkage being set up between the mount and the first linkage. Through the linking of the linkage set, the angles between the upper cart stand and the handle bar and between the bottom cart stand and the rear wheel frame will change for the folding or fixing of the device.

7 Claims, 10 Drawing Sheets

GOLF BAG CART FOLDABLE DEVICE

BACKGROUND OF THE INVENTION

1. Field of the Invention

The present invention relates to golf bag cart foldable devices, more particularly, to one that features simultaneous unfolding or folding for its upper cart stand, bottom cart stand, handle bar and rear wheels, to accomplish particular handiness in use.

2. Description of the Prior Art

The prior art golf bag cart foldable device (I) has a structure as in FIG. 1, where its upper cart stand B1 and bottom cart stand B4 are provided with a rotational joint B11 in between. The upper cart stand B1 and the rear wheel frame B3 are linked by a pole B2. The moment that the upper cart stand B1 is being folded, the two rear wheels B31 & B32 are linked to shrink inward for being folded; on the other hand, the upper cart stand B1 and the handle bar B5 are provided with a folding joint B51, which makes a forward (backward) folding of the handle bar B5 possible.

Due to the link between the upper cart stand B1 and the rear wheel frame B3 is by the pole B2, the rotation of the upper cart stand B1 would drive the two rear wheels B31 & B32 to shrink inward for being folded for the completion of the folding. Since its rotational joint B11 and folding joint B51 are independently set up, the user has to operate them separately to complete the unfolding or folding of the golf bag cart, which considerably deteriorates the usage.

The prior art golf bag cart foldable device (II) has a structure as in FIG. 2, where its upper cart stand C1 and bottom cart stand C4 are provided with a rotational joint C11 in between. The upper cart stand B1 and the handle bar C5 are provided with a folding joint C51, which enables the forward (backward) folding of the handle bar C5. Since the rotational joint C11 and folding joint C51 are independently set up, the user has to operate them separately to complete the unfolding or folding of the golf bag cart, which also considerably deteriorates the usage.

When the golf bag cart of (II) is loaded for its bag, the pocket at the backend of the bag won't interfere much with the upper cart stand. But the two rear wheels C31 & C32 are fixed at the bottom cart stand C4, it means the distance between the two rear wheels C31 & C32 is a constant. Once the wheels are folded, the distance between the two rear wheels C31 & C32 cannot be shortened, where the entire volume of the cart therefore cannot be contracted, and it for sure takes wider space during carrying or conveying. All the drawbacks are to be improved.

The applicant of this invention realized the situation and instructed the inventor to push hardly ahead with the research and design, and eventually gave birth to the present invention.

SUMMARY OF THE INVENTION

The objective of the present invention is to provide a golf bag cart foldable device, which features simultaneous unfolding or folding for its upper and bottom stands, handle bar and rear wheels, to achieve particular handiness in use.

To achieve the foregoing objective, the present invention comprises: a bottom cart stand, having a link segment at its top, where both sides of the link segment each is in pinned connection with a rear wheel frame, which has its bottom end join the rear wheel, and the bottom cart stand is provided with a slider at the bottom of the link segment; an upper cart stand, being in pinned connection with the link segment of the bottom cart stand at its bottom, and having a bracket at its top, where the bracket couples to a mount at its one end; a handle bar, joined the mount of the upper cart stand at its bottom at which an angle adjustable joint is located, having a score board at its top; and a linkage set, comprising a first linkage, a second linkage and a third linkage, where the first linkage is set up between the upper cart stand and the slider of the bottom cart stand, to link the upper cart stand physically to the slider, and the second linkage is set up between the slider of the bottom cart stand and rear wheel frame, to link the slider physically to the rear wheel frame, while the third linkage is set up between the mount of the upper cart stand and the first linkage, to link the upper cart stand physically to the handle bar; during the folding, the handle bar is first pushed down, and through the linking of the linkage set, the angles between the upper cart stand and the handle bar and between the bottom cart stand and the rear wheel frame will get smaller, for the contraction and merging, and also the folding of the rear wheels; on the contrary, once the handle bar is pulled up, and through the linking of the linkage set, the angles between the upper cart stand and the handle bar and between the bottom cart stand and the rear wheel frame will get wider, which is then ready for a fixing, to achieve a convenient use.

DETAILED DESCRIPTION OF THE INVENTION

Figure 1:
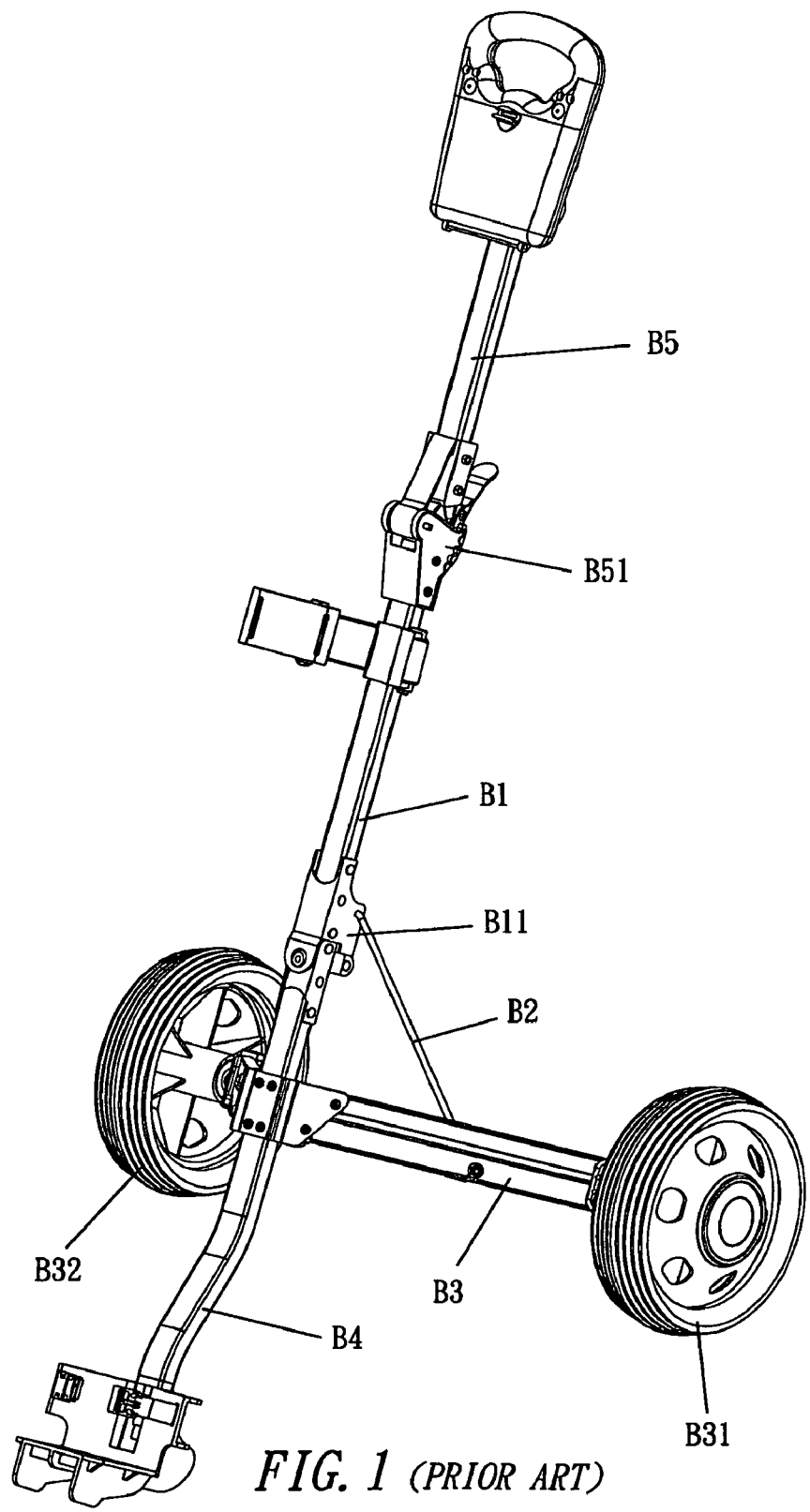
FIG. 1 is a three-dimensional diagram of the unfolding of the golf bag cart of the prior art (I)
Figure 2:
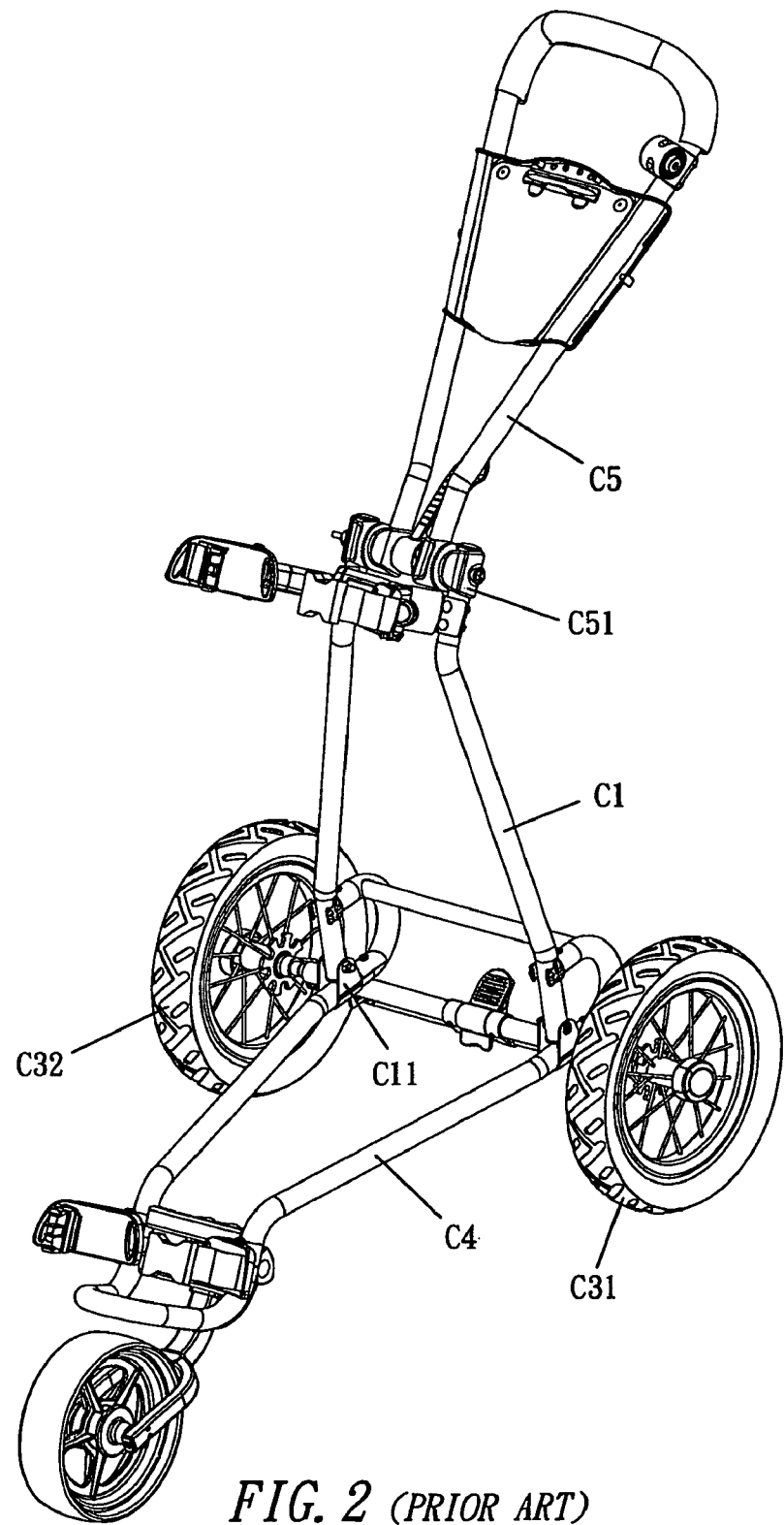
FIG. 2 is a three-dimensional diagram of the unfolding of the golf bag cart of the prior art (II)
Figure 3:
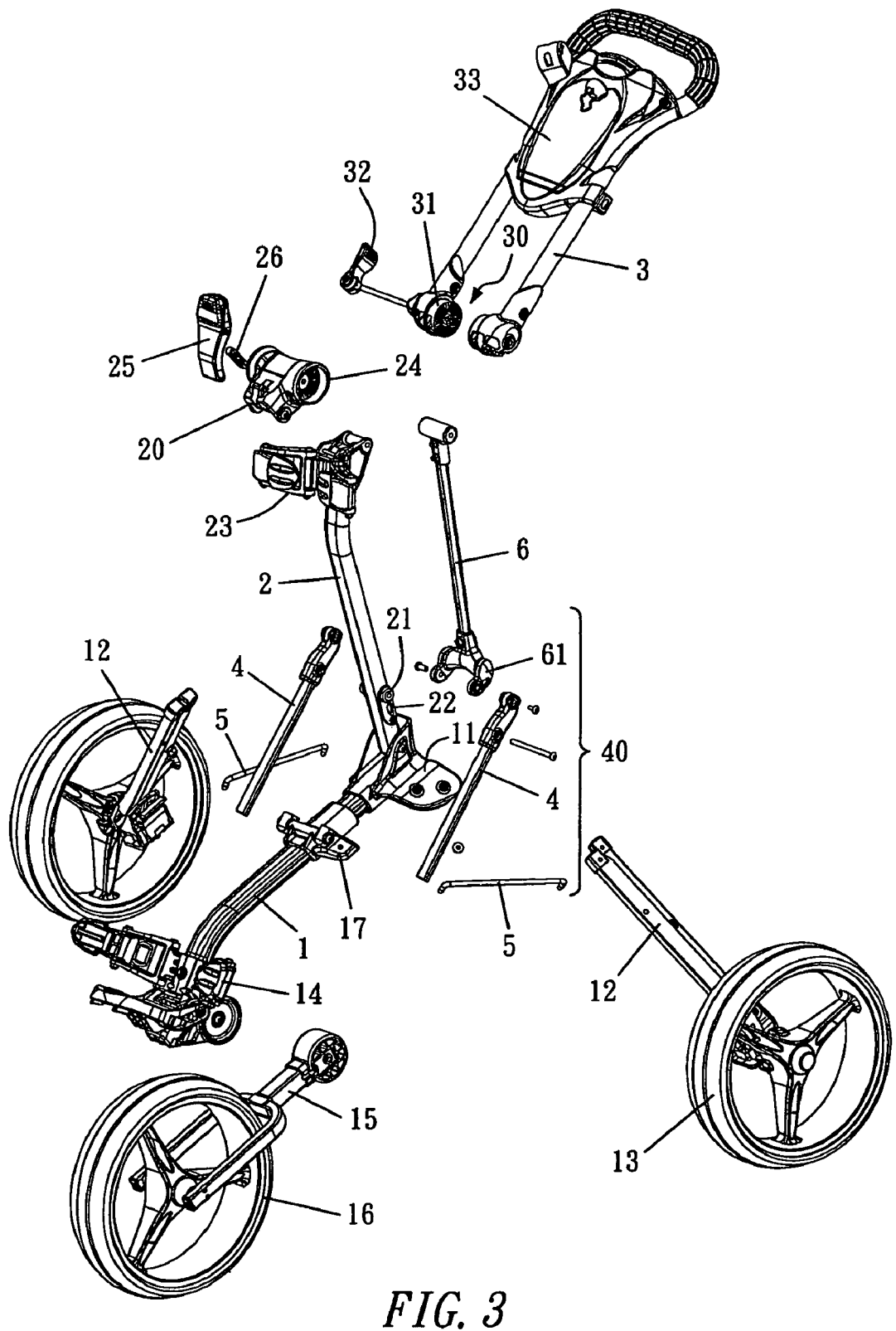
FIG. 3 is a three-dimensional exploded view of the present invention.

To achieve the foregoing objects of the present invention, the techniques adopted and the achievable function are detailed described with reference to the following preferred exemplified embodiment and the accompanying drawings, which helps a thorough comprehension of the traits of the present invention.

Referring to FIGS. 3-7, the present invention comprises:

a bottom cart stand 1, having a link segment 11 at its top, where the two sides of the link segment 11 each is in pinned connection with a rear wheel frame 12 which has its bottom end join the rear wheel 13, and having a bag base 14 at its bottom, where the base 14 couples a front wheel frame 15 which connects to the front wheel 16 at its bottom end, while the bottom cart stand 1 is further provided with a slider 17 at the bottom of the link segment 11, which can slide along the bottom cart stand 1, and the bottom cart stand 1 is also provided with a spring 18 at its internal, where the spring 18 is joined fixedly to the slider 17 at its one end, while the other end joins fixedly to the link segment 11;

an upper cart stand 2, in pinned connection with the link segment 11 of the bottom cart stand 1 at its bottom, having a hinge 21 and a hanger base 22, where the hanger base 22 is provided with a hook-shaped cavity 221, and having a bag carry base 23, where the carry base 23 couples to a mount 20 through the fixing by a bolt 231 at its one side (inner side), while the mount 20 at its top is provide with a sleeve 24, which has a buckle 25 and a draw bar 26 at its one side, where the buckle 25 couples to the mount 20 through the fixing by a bolt 251 at its bottom, and both ends of the draw bar 26 couple to the mount 20 and the buckle 25 by the bolts 261 & 262 respectively, where the buckle 25 and the draw bar 26 are used to anchor the relative positions of the carry base 23 and the mount 20;

a handle bar 3, presented a Π shape, having its bottom connected to the mount 20 of the upper cart stand 2, and having an angle adjustable joint 30, including two tooth disks 31 and the sleeve 24 of the upper cart stand 2, which are pierced and fixed by a buckle 32, where the contact surfaces of the two tooth disks 31 and the sleeve 24 are provided with teeth which seize to each other, for providing the means to adjust the angle of using the handle bar 3, and a score board 33 is set up at the top of the handle bar 3, where the score board 33 is provided with a hanger 34 at its back, which rotates with respect to the score board 33, and the score board 33 and the hanger 34 are provided with a torque spring 35 in between, enabling the hanger 34 to restore automatically once the hanger 34 is pressed down; and a linkage set 40, comprising first linkages 4, second linkages 5 and a third 6 linkage, where the first linkages 4 are located in the both sides of the joining of the upper cart stand 2 and the bottom cart stand 1, and couple to the slider 17 of the bottom cart stand 1 at its bottom, while coupling to the hinge 21 of the upper cart stand 2 at its top, which features to link the upper cart stand 2 physically to the slider 17; the second linkages 5 join the slider 17 of the bottom cart stand 1 to the two rear wheel frames 12 respectively, capable to link the slider 17 physically to the rear wheel frame 12; the third linkage 6 is connected to the mount 20 (sleeve 24) of the upper cart stand 2 at its top, and has a rotating piece 61 at its bottom, for the coupling to the first linkage 4, capable to link the upper cart stand 2 physically to the handle bar 3.

Figure 4:
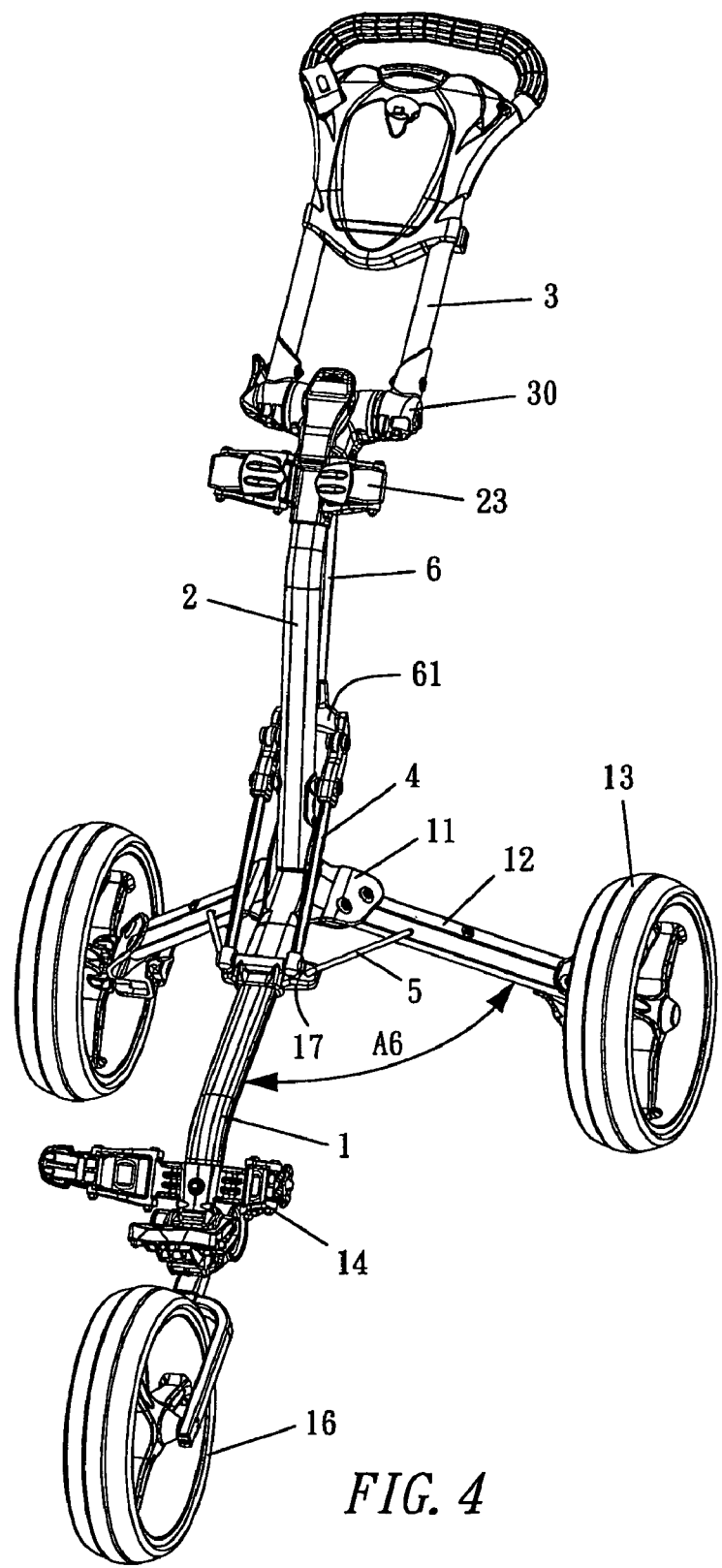
FIG. 4 is a three-dimensional view of the unfolding of the present invention.
Figure 5:
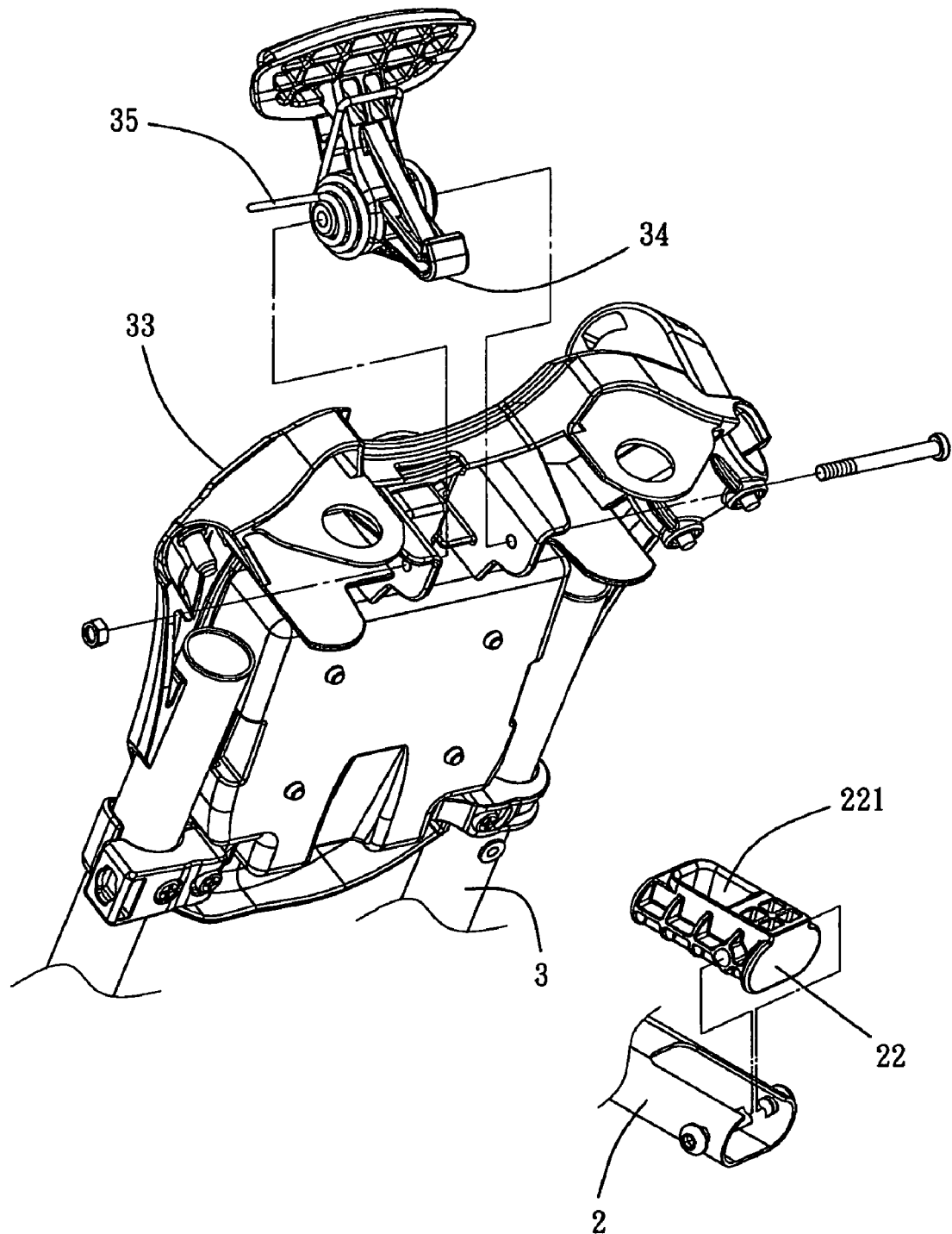
FIG. 5 is a three-dimensional exploded view of the upper cart stand and the handle bar portions of the present invention.
Figure 6:
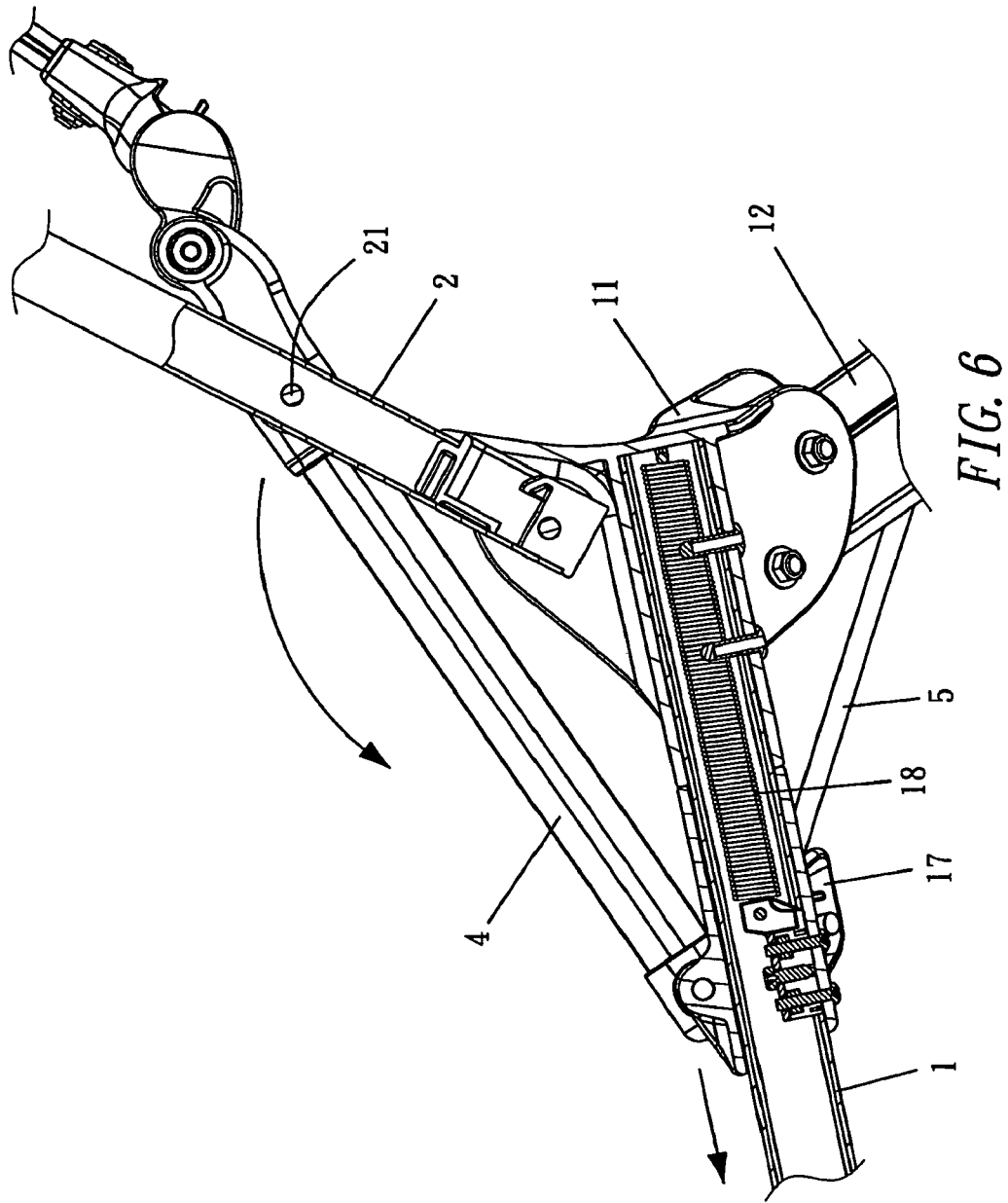
FIG. 6 is a schematic sectional view of the bottom cart stand portion of the present invention.
Figure 8:
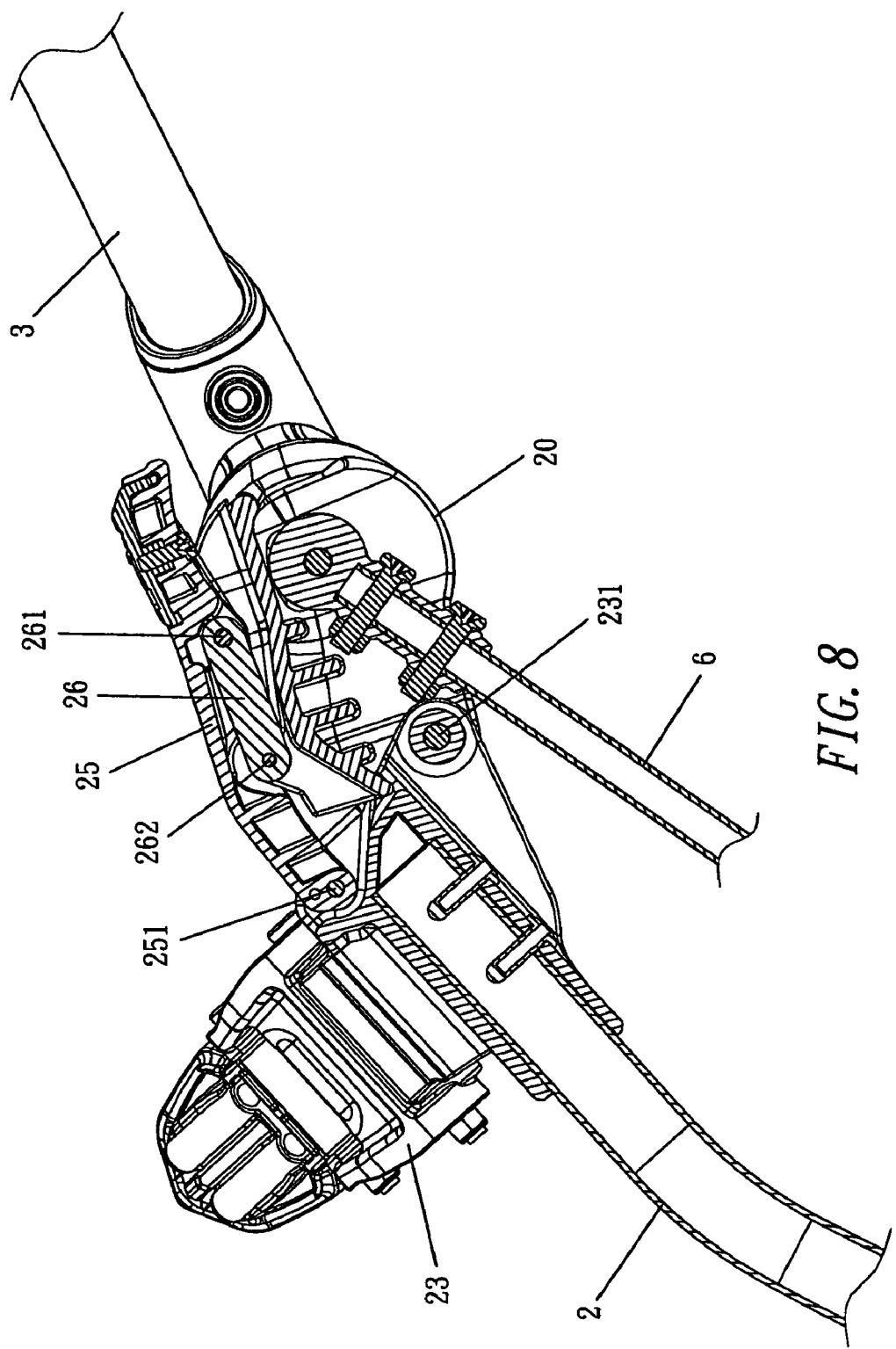
FIG. 8 is a relational position view of the handle bar and the upper cart stand during the unfolding of the present invention.

According to the foregoing structural combination, the golf bag cart presents an unfolding state during a regular situation, shown in FIGS. 4 & 6, and at this moment the spring 18 is lengthened in an extended state, where the buckle 25 presents a pressed-down state, which helps to anchor the relative positions of the carry base 23 and the mount 20, shown in FIG. 8, that is, to anchor the positions of the handle bar 3 and the upper cart stand 2 to each other, and the upper cart stand 2, the bottom cart stand 1 and the rear wheel frame 12 are then simultaneously fixed in the unfolding of the golf bag cart, subject to the interaction among the first linkage 4, the second linkage 5 and the third linkage 6, and no additional joints are needed to be fixed.

Figure 7:
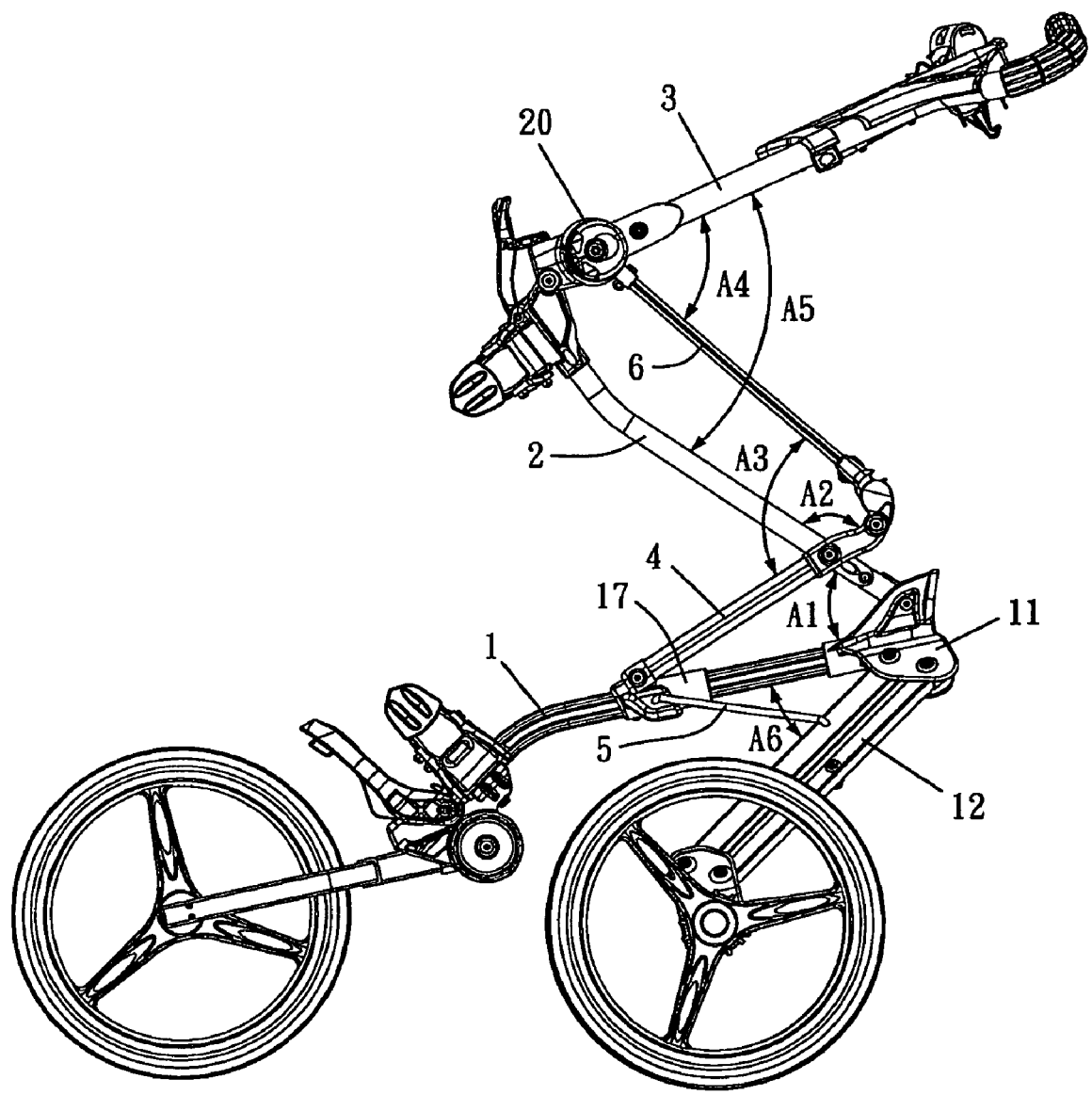
FIG. 7 is a schematic diagram of the motions of the folding of the present invention.
Figure 9:
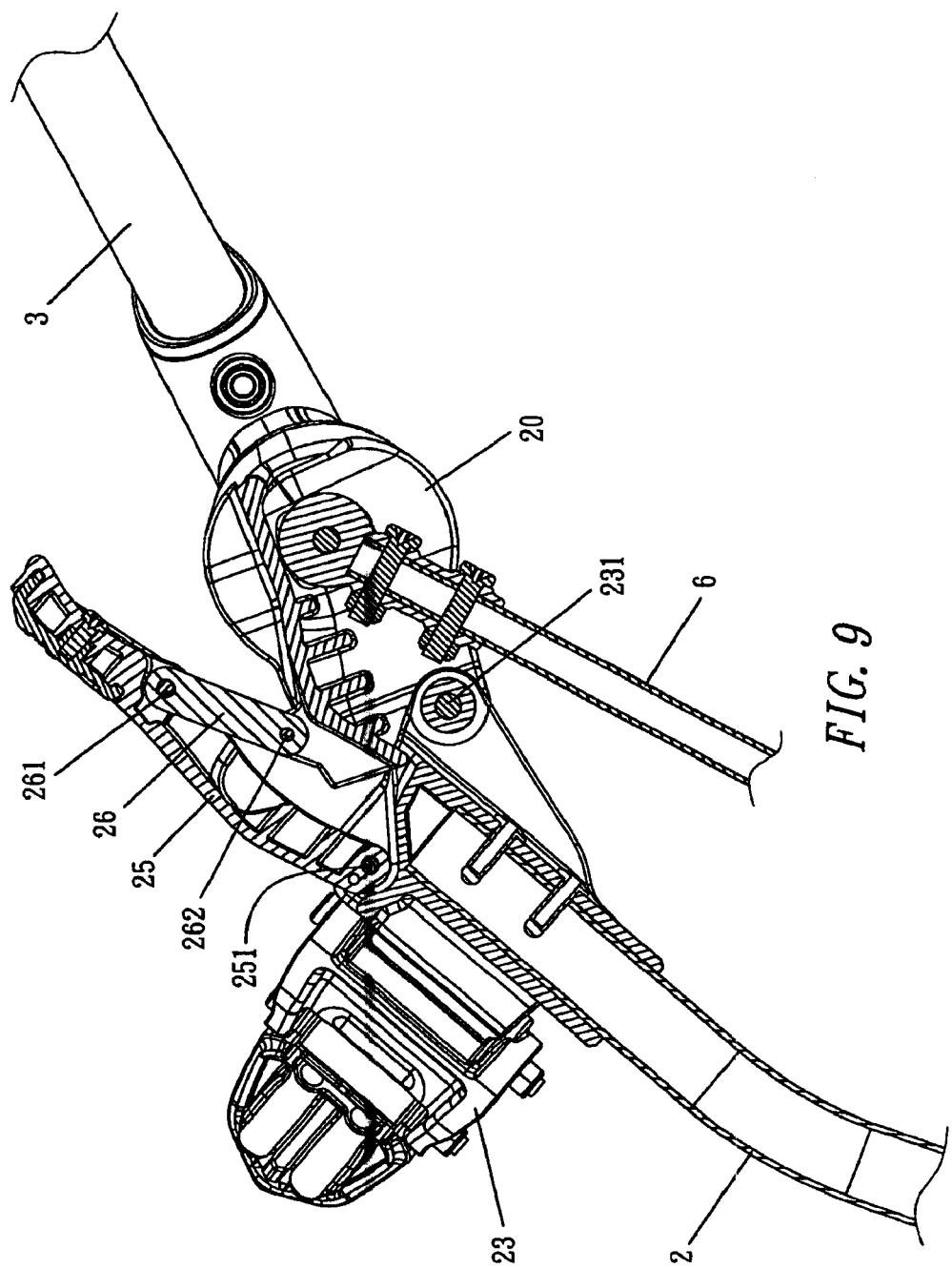
FIG. 9 is a relational position view of the handle bar and the upper cart stand during the folding of the present invention.
Figure 10:
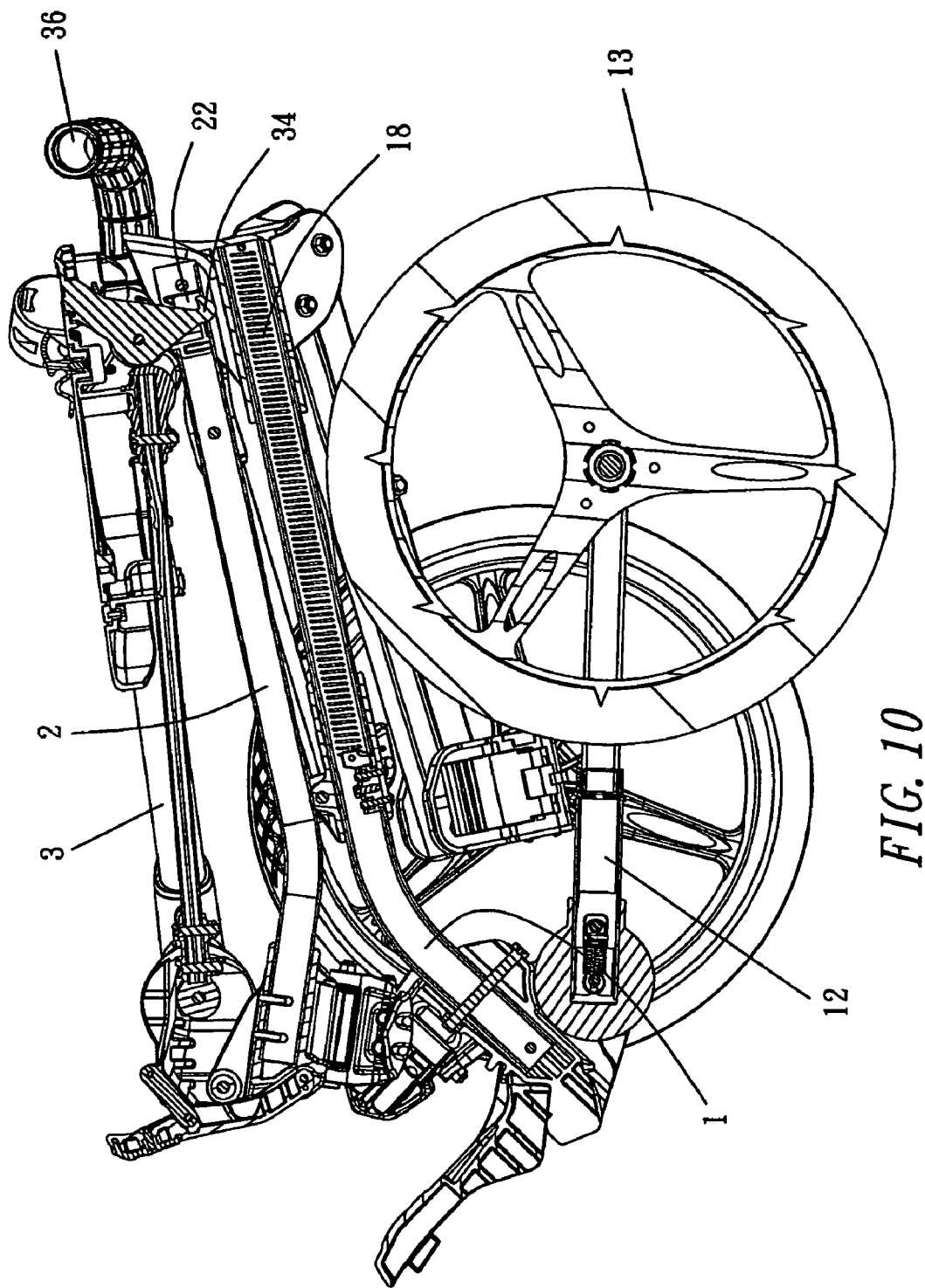
FIG. 10 is a schematic diagram of the folding of the present invention.

During the folding, the buckle 25 is first pulled up and the handle bar 3 is pushed down, and once the center of the bolt 262 is positioned higher than the line connecting the two centers of the bolts 231 & 261, a state of free rotation is formed, and the mount 20 is rotates relatively to the carry base 23, such that the included angle A5 between the handle bar 3 and the upper cart stand 2 gets smaller and smaller, shown in FIGS. 7 & 9; therefore, as the upper cart stand 2 rotates downward, the included angle A1 between the upper cart stand 2 and the bottom cart stand 1 turns smaller, to drive the first linkage 4 to push the slider 17 moving forward along the bottom cart stand 1, and the slider 17 further drives the second linkage 5 to pull the rear wheel frame 12 in moving forward and inward, such that the included angle A6 between the rear wheel frame 12 and the bottom cart stand 1 gets smaller, and the rear wheels 13 are pushed forward and inward for the folding; as the slider 17 slides forward along the bottom cart stand 1, the included angle A2 between the top of the first linkage 4 and the upper cart stand 2 gets wider, and the first linkage 4 is hence simultaneously pulling the third linkage 6, which results in the included angle A3 between the first linkage 4 and the third linkage 6 gets smaller, and the third linkage 6 is linked to rotate the mount 20 backward, enabling the included angle A4 between the third linkage 6 and the mount 20 to become smaller, and the handle bar 3 is pulled to rotate down to make the included angle A5 between the handle bar 3 and the upper cart stand 2 get smaller; therefore, as long as the handle bar 3 is pushed down, the included angle between the handle bar 3 and the upper cart stand 2 gets smaller, and all are folded to merge one another, while the two rear wheels 13 are folded subsequently and the front wheels 16 are finally turned backward under the bottom of the bottom cart stand 1, to accomplish the folding of the golf bag cart, shown in FIG. 10, where the operation is handy, and the cart volume is available for the contraction.

On the contrary, once the golf bag cart demands an unfolding, the procedure starts by pulling the handle bar 3 up, and the included angle between the handle bar 3 and the upper cart stand 2 gets wider, while the two rear wheels 13 are opened and the buckle 25 is pulled down, and once the center of the bolt 262 is positioned lower than the line connecting the two centers of the bolts 231 & 261, a state of self-locking (over the start point) is formed, and the relative positions of the carry base 23 and the mount 20 are put to anchor, where the positions of the handle bar 3 and the upper cart stand 2 stabilize to each other, and the bottom cart stand 1, the upper cart stand 2 and the rear wheel frame 12 are therefore simultaneously fixed in the unfolding of the golf bag cart, subject to the interaction among the first linkage 4, the second linkage 5 and the third linkage 6, and no additional joints are needed to be fixed, for the completion of the unfolding of the golf bag cart, shown in FIGS. 4 & 6, which is handy in use.

During the unfolding of the bottom cart stand 1, the slider 17 slides toward the link segment 11 automatically subject to the contraction of the spring 18, to support the force demanded for the unfolding, so that a minute pull on the handle bar 3 can unfold the golf bag cart. The included angle A1 between the upper cart stand 2 and the bottom cart stand 1 as the above described, will get smaller and smaller during the folding, until the positions of the two frames are parallel, and the angle A1 at this moment is zero degree, which forms the start point of the four linkage mechanism made up of the upper cart stand 2, the bottom cart stand 1, the slider 17 and the first linkage 4. When the upper cart stand 2 keeps folding down from the start point and the angle A1 between the upper cart stand 2 and the bottom cart stand 1 is negative value, the four linkage mechanism comes to a self-locking state, which makes the spring 18 fail to gather the slider 17. Therefore, the folding doesn't need to stabilize the slider 17, and the bottom cart stand 1 won't spread out automatically because of the elastic force of the spring 18. On the contrary, for the spreading out of the bottom cart stand 1, once the upper cart stand 2 is pulled up until the angle A1 is bigger than the zero degree, the elastic force of the spring 18 then exerts effectively on the slider 17, which will pull the slider 17 backward, to support the force needed in the unfolding.

Again, during the folding of the golf bag cart, the hanger 34 will jostle with the incline back of the cavity 221 of the hanger base 22, and gradually slide into the cavity 221, to make the hanger 34 seize the hanger base 22, and make the handle bar 3 and the upper cart stand 2 to lock each other, which enables the user hold the grip 36 at the top of the handle bar 3 with ease, to accomplish the handy carrying.

From the description in the above, the present invention features at least the following advantages and functions, which is much creative than the prior art.

1. The cart stands (including: the handle bar) and the rear wheels can be folded simultaneously, which features truly handy in use, and available for contraction in volume.
2. During the folding or unfolding of the cart, the handle bar and the cart stands are locking to each other, for handy carrying.
3. The cart stands (including: the handle bar) and the rear wheels can be unfolded and stabilized simultaneously, and no additional joints to be fixed, truly handy in use.

To sum up, the disclosed concrete structure of the exemplified embodiment of the present invention is not only unknown to the prior art, but surely can accomplish the expected objective and function, which is construed as absolutely novel and creativeness and is compliant to the requirements of patent law, and a patent application for the invention is then filed.

What is claimed is:

1. A golf bag cart foldable device, comprising:
    a.) a bottom cart stand, having a link segment at its top, where both sides of the link segment each is in pinned connection with a rear wheel frame which has its bottom end join the rear wheel, and said bottom cart stand being provided with a slider at the bottom of the link segment;
    b.) an upper cart stand, in pinned connection with the link segment of said bottom cart stand at its bottom, and having a bracket at its top, where the bracket couples to a mount at its one end;
    c.) a handle bar, joined the mount of said upper cart stand at its bottom at which an angle adjustable joint is located, having a score board at its top; and
    d.) a linkage set, comprising first linkages, second linkages and a third linkage, where the first linkage is set up between said upper cart stand and the slider of said bottom cart stand, to link said upper cart stand physically to the slider, and the second linkage being set up between the slider of said bottom cart stand and rear wheel frame, to link the slider physically to the rear wheel frame, while the third linkage is set up between the mount of said upper cart stand and the first linkage, to link said upper cart stand physically to said handle bar;
    wherein during the folding, said handle bar being first pushed down, and through the linking of the linkage set, the angles between said upper cart stand and said handle bar and between said bottom cart stand and the rear wheel frame getting smaller, for the contraction and merging, and also the folding of the rear wheels; on the contrary, once said handle bar being pulled up, and through the linking of the linkage set, the angles between said upper cart stand and said handle bar and between said bottom cart stand and the rear wheel frame getting wider, which is then ready for a fixing, to achieve a convenient use.

2. A golf bag cart foldable device as in claim 1 wherein said bottom cart stand is provided with a spring at its internal, which has its one end joining fixedly to the slider, and the other end to the link segment.

3. A golf bag cart foldable device as in claim 1 wherein said upper cart stand is provided with a hinge and a hanger base at its bottom, where the hinge couples to the first linkage, and the hanger base being provided with a cavity.

4. A golf bag cart foldable device as in claim 1 wherein the mount of said upper cart stand is provided with a sleeve.

5. A golf bag cart foldable device as in claim 1 wherein the mount of said upper cart stand is provided with a buckle and a draw bar at its one side, where the bottom end of the buckle couples fixedly to the mount, and both ends of the draw bar couple to the mount and the buckle respectively.

6. A golf bag cart foldable device as in claim 1 wherein the score board of said handle bar is provided with a hanger at its back, and the hanger rotating relatively to the score board, where the score board and the hanger are provided with a torque spring in between.

7. A golf bag cart foldable device as in claim 1 wherein the first linkage and the third linkage of said linkage set are provided with a rotating piece in between.

* * * * *